Jan. 21, 1969   P. B. BENNER ET AL   3,423,129
COOLANT FILLED VEHICLE WHEELS
Filed April 5, 1967
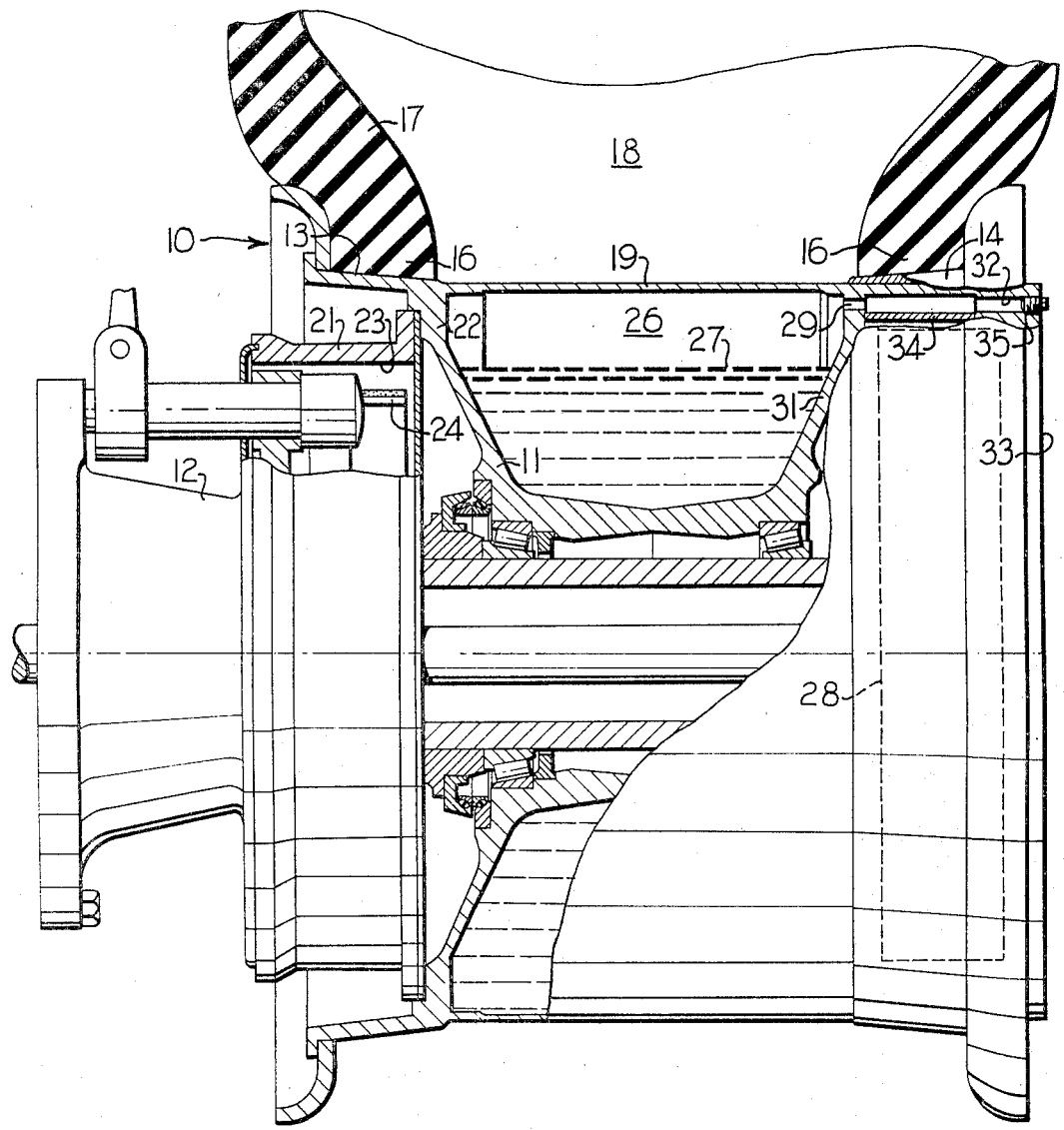
INVENTORS
PAUL B. BENNER
MARVIN E. BEYERS
LARRY G. WARREN
BY
ATTORNEYS United States Patent Office 3,423,129
Patented Jan. 21, 1969

3,423,129
COOLANT FILLED VEHICLE WHEELS
Paul B. Benner, Decatur, Marvin E. Beyers, Peoria, and Larry G. Warren, Decatur, Ill., assignors to Caterpillar Tractor Co., Peoria, Ill., a corporation of California
Filed Apr. 5, 1967, Ser. No. 628,667
U.S. Cl. 301—6    1 Claim
Int. Cl. B60b *19/06;* F16d *65/82*

ABSTRACT OF THE DISCLOSURE

Means for preventing localized heat build-up in a vehicle wheel of a type including a pneumatic tire and having a brake drum disposed thereon. A generally annular cavity is defined by the wheel to have at least a part of the cavity generally adjacent the brake drum. Coolant is disposed in the cavity defined by the wheel to receive and dissipate localized heat generated by the brake drum.

*Background of the invention*

Vehicle wheels of a type having a pneumatic tire disposed therearound commonly have a brake drum connected to the wheel webbing. When a brake shoe or other braking means is brought into contact with the brake drum for braking of the wheel and vehicle, friction between the brake shoe and rotating brake drum generates considerable heat within the brake drum, particularly when the vehicle to be braked is of a type for carrying heavy loads, such as in earth moving equipment. Generally, the brake is of a large cylindrical shape to have the brake shoe disposed within it and to provide a large internal braking surface; accordingly, the brake drum is connected to the wheel generally adjacent the tire rim or seating surface of the wheel which receives the bead of the pneumatic tire.

A problem arises in the above configuration in that localized heat generated within the brake drum is transmitted into the wheel webbing and the adjacent seating surface of the pneumatic tire bead. Abusive use of the brakes may cause very high temperatures to result in the wheel webbing due to the localized heat transmitted thereinto from the brake drums. These high temperatures will also exist in the tire seating surfaces from which they may be transferred into the pressure chamber defined by the pneumatic tire to cause undesirable pressure variations therein. Further, the high temperatures thus existing in the seating surfaces of the wheel may be transferred to the tire bead to cause possible deterioration and a shortened operating life of the tire.

*Summary of the invention*

The present invention provides means by which excessive localized heat build-up is prevented in a vehicle wheel having a pneumatic tire disposed thereon and having a brake drum connected to the wheel generally adjacent the pneumatic tire.

*Brief description of the drawing*

The drawing is an elevation view, partially in section, of a vehicle wheel having a brake drum connected thereto, partially illustrating a pneumatic tire disposed upon the wheel and including the chamber and cooling means of the invention.

*Description of the preferred embodiment*

Referring now to the drawing, a typical vehicle wheel indicated at 10 comprises a generally cylindrical structural wheel webbing 11 suitable for mounting on an axle 12 of a vehicle (not shown). The wheel has inner and outer seating surfaces along its periphery, indicated at 13 and 14, respectively, for receiving and maintaining the beads 16 of a pneumatic tire 17. The pneumatic tire and the wheel define an internal pressure region 18 which is hermetically enclosed by the tire and peripheral surface 19 of the wheel webbing. A cylindrical brake drum 21 is connected to an inside portion of the wheel webbing indicated at 22 and has an internal cylindrical surface 23 against which a brake shoe 24 is to be applied for deceleration or stopping of the vehicle.

The wheel indicated at 10 is preferably of a type for vehicles employed to carry heavy loads, for example, earthmoving equipment. To provide as large an internal braking surface at 23 as possible, brake drum 21 is of a large diameter and accordingly is connected to the wheel webbing 11 at a point adjacent to the seating surface 13 and the tire bead 16 disposed thereon. Particularly in such high load capacity vehicles, contacting application of the brake shoe 24 against the rotating brake drum 21 causes friction which generates very substantial amounts of heat at brake drum surface 23 which is transmitted through the brake drum into the wheel webbing at 22. Due to the thin cross-section of the wheel webbing, the generated heat tends to remain localized and accordingly is concentrated in the wheel web portion generally at 22, as well as along the seating surface 13. Thus, very high temperatures may be produced within the bead 16 which may be injurious to the bead or to the entire tire 17 as discussed above.

The wheel webbing 11 is constructed to define a generally annular chamber or cavity indicated at 26 to have at least a portion of the wheel cavity 26 in communication and heat transfer relation with the portion 22 of the wheel web to which the brake drum is connected.

To prevent heat generated in the brake drum from being localized in the wheel adjacent the tire beads, heat transfer or coolant means, indicated at 27, are disposed within the cavity defined by the wheel to absorb heat which is generated by the brake drum and transmitted to the connecting web portion at 22. The coolant is of a type suitable to act as a heat sink for heat received from the connecting web portion 22 and further to transmit such heat throughout the wheel structure such that localized heat at the critical areas of the wheel is limited to a suitable operating temperature for the tire bead.

The coolant means may be any material suitable for absorbing and dispersing such localized heat from the wheel webbing to maintain the tire bead within safe operational temperature limits. For example, the wheel cavity indicated at 26 could be filled with a thermally conductive solid material such as copper or aluminum. The coolant means is preferably a liquid such as oil or water to permit a more rapid rate of heat transfer away from the brake drum. To provide a coolant which is non-explosive and which is suitable for cold weather operation, the wheel cavity is preferably filled, at least partially, with a solution of ethylene glycol in water. For example, a solution may comprise 40% of an ethylene glycol type permanent anti-freeze having a suitable rust inhibitor and 60% water. The wheel cavity is of course sealed to prevent escape of coolant or transfer thereof into lubricated areas.

To provide means by which coolant may be placed in the wheel cavity, a port may be provided in the sidewalls of the wheel webbing 11 with suitable means, such as a plug, for closing the port and maintaining the sealed condition of the wheel cavity. However, the present wheel indicated at 10 is of a type having a planetary gear drive arrangement 28 disposed on the outside of the wheel webbing 11. To provide access to the wheel cavity 26 without the necessity for at least partially disassembling the wheel, a port 29 is provided in an outside sidewall 31 of the wheel webbing generally adjacent the peripheral portion 19 of the wheel. A similar port 32 extends through the outer housing wall 33 of the planetary gear arrangement to be aligned with the wheel webbing port 29. A suitable liquid tight passage is provided between the two ports by, for example, a tubular insert aligned between the ports or by sheet metal as indicated at 34 forming a liquid tight passage between the ports. A removable plug 35 is disposed in the port 32 defined by the outer planetary gear housing wall 33.

What is claimed is:

1. A vehicle wheel of a type having a pneumatic tire disposed thereon, a brake drum connected to the inside of the wheel adjacent the tire and planetary drive means, with an outside cover disposed on the outside of the wheel, the wheel adapted for preventing heat generated by the brake drum from being transmitted to and localized in the wheel adjacent an inside bead of the pneumatic tire and comprising:

a generally cylindrical wheel webbing having seating surfaces at the periphery thereof for receiving the pneumatic tire and inner and outer structural sidewalls, the brake drum being in thermal communication with the inside webbing wall adjacent one of its seating surfaces, said wheel webbing defining a generally annular liquid-tight cavity therein for receiving coolant means to be in thermal communication with said inside webbing sidewall adjacent the brake drum;

a passage defined by the outer webbing sidewall adjacent the webbing periphery;

a passage defined by the outside cover of the planetary drive means to be aligned with said webbing sidewall passage;

means disposed between said passages to provide liquid-tight communication therebetween; and replaceable plug means disposed in said passage for providing a liquid-tight closure therein.

References Cited

UNITED STATES PATENTS

| | | | |
|---|---|---|---|
| 2,254,074 | 8/1941 | Klaue | 188—264 |
| 2,951,562 | 9/1960 | Sampson | 301—6 |
| 2,976,083 | 3/1961 | Zinc | 301—6 |
| 3,055,458 | 9/1962 | Sanford | 301—6 |
| 3,184,994 | 5/1965 | Stahl | 180—43 |
| 3,365,986 | 1/1968 | Mazziotti | 180—43 |

RICHARD J. JOHNSON, *Primary Examiner.*

U.S. Cl. X.R.

188—264